(12) United States Patent
Kori (10) Patent No.: US 9,518,694 B2
(45) Date of Patent: Dec. 13, 2016

(54) WORM MECHANISM AND UNIVERSAL HEAD APPARATUS USING THE SAME

(71) Applicant: CANON KABUSHIKI KAISHA, Tokyo (JP)

(72) Inventor: Yoshifumi Kori, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/607,547

(22) Filed: Jan. 28, 2015

(65) Prior Publication Data

US 2015/0219271 A1 Aug. 6, 2015

(30) Foreign Application Priority Data

Jan. 31, 2014 (JP) ................. 2014-016780

(51) Int. Cl.
*F16H 55/24* (2006.01)
*F16M 11/18* (2006.01)
*F16M 11/12* (2006.01)
*F16M 11/04* (2006.01)
*F16H 1/16* (2006.01)

(52) U.S. Cl.
CPC ............ *F16M 11/18* (2013.01); *F16H 55/24* (2013.01); *F16M 11/126* (2013.01); *F16H 1/16* (2013.01); *F16M 11/04* (2013.01); *Y10T 74/19623* (2015.01)

(58) Field of Classification Search
USPC ........................................ 720/663, 664, 665
See application file for complete search history.

(56) References Cited

U.S. PATENT DOCUMENTS

| 4,609,959 | A | * | 9/1986 | Rudi .................... 360/261.3 |
| 4,652,952 | A | * | 3/1987 | Maeda ................ G11B 21/08 360/267.7 |
| 4,833,558 | A | * | 5/1989 | Baheri ................. 360/261.3 |
| 5,414,578 | A | * | 5/1995 | Lian .................... G11B 5/5504 360/261.3 |
| 5,448,438 | A | * | 9/1995 | Kasetty ............. F16H 25/2009 360/261.3 |
| 5,537,275 | A | * | 7/1996 | Peace et al. ........... 360/291.2 |
| 5,680,278 | A | * | 10/1997 | Sawtelle, Jr. ............. 360/261 |
| 5,706,149 | A | * | 1/1998 | Hoelsaeter ............. 360/261.3 |
| 6,061,209 | A | * | 5/2000 | Stephens et al. ........ 360/261.3 |
| 6,157,516 | A | * | 12/2000 | Hertrich et al. ........... 360/128 |
| 6,307,718 | B1 | * | 10/2001 | Kasetty ................. 360/291.1 |
| 6,639,760 | B2 | * | 10/2003 | Dyer et al. ............. 360/261.3 |

(Continued)

FOREIGN PATENT DOCUMENTS

| JP | 07332588 | A | * | 12/1995 | ............ F16M 11/08 |
| JP | 10164399 | A | * | 6/1998 | ............ H04N 5/222 |

(Continued)

*Primary Examiner* — Brian Miller (74) *Attorney, Agent, or Firm* — Canon U.S.A., Inc. IP Division (57) ABSTRACT

Provided is a worm mechanism provided with a worm shaft including a worm, and a worm wheel that meshes with the worm, the worm mechanism including: a first holding member configured to join a drive source that drives the worm shaft to bearings that support the worm shaft at both sides so that the worm shaft is rotatable; and a first urging member configured to urge the first holding member in a first direction in which the worm meshes with the worm wheel.

20 Claims, 7 Drawing Sheets (56) References Cited

U.S. PATENT DOCUMENTS

6,844,997 B2 * 1/2005 Tamura ............... G11B 5/584
                                                    360/261.3
8,028,309 B2 * 9/2011 Lin ................. G11B 7/08582
                                                    720/659

FOREIGN PATENT DOCUMENTS

| JP | 2006140712 A | * | 6/2006 |
| JP | 2008-100640 A | | 5/2008 |
| JP | 2012-251601 A | | 12/2012 |
| JP | 2013-129417 A | | 7/2013 |

* cited by examiner

WORM MECHANISM AND UNIVERSAL HEAD APPARATUS USING THE SAME

BACKGROUND OF THE INVENTION

1. Field of the Invention

The present invention relates to a worm mechanism and a universal head apparatus using the same.

2. Description of the Related Art

A typical universal head apparatus includes image pickup apparatus and carries out pan and tilt driving using drive force from a motor (i.e., a drive source). Such a universal head apparatus employs a reduction gear in which a worm (i.e., a screw gear) and a worm wheel are used. To make the universal head apparatus move smoothly, removing a backlash between the worm on the drive side and the worm wheel on the driven side is necessary. Then, a technique of urging the worm on the drive side against the worm wheel on the driven side by means of an elastic body is used widely to remove a backlash between the worm and the worm wheel.

Japanese Patent Laid-Open No. 2013-129417 discloses a method for urging a worm shaft toward an axial direction of a worm wheel using an urging member while elastically supporting the worm shaft in the direction of the worm wheel. Japanese Patent Laid-Open No. 2008-100640 discloses a technique of forming a worm integrally with an output shaft of a motor and arranging bearings with the motor and the worm disposed therebetween.

In the related art disclosed in Japanese Patent Laid-Open No. 2013-129417, the worm shaft is tilted about a joint, as a support point, that joins a motor shaft (i.e., a driving shaft) and the worm shaft. When the worm shaft is tilted in such a configuration, coaxiality between a worm shaft and the motor shaft decreases and, as a result, smooth driving becomes impossible. Additionally, in such a configuration, urging an outer part of one of the bearings applies unfavorably large load on the bearing.

In the related art disclosed in Japanese Patent Laid-Open No. 2008-100640, durability decreases although a decrease in coaxiality may be reduced. The reason of the decrease in durability is that excessively large load is applied to a bearing because one of the bearings itself is urged as in the case of Japanese Patent Laid-Open No. 2013-129417.

The present invention provides a worm mechanism with reduced load on bearings and improved durability while reducing a backlash between gears, and also provides a universal head apparatus using the worm mechanism.

SUMMARY OF THE INVENTION

The worm mechanism according to the present invention is a worm mechanism provided with a worm shaft including a worm, and a worm wheel that meshes with the worm, the worm mechanism including: a first holding member configured to join a drive source that drives the worm shaft to bearings that support the worm shaft at both sides so that the worm shaft is rotatable; and a first urging member configured to urge the first holding member in a first direction in which the worm meshes with the worm wheel.

A universal head apparatus according to the present invention includes: the worm mechanism; a pedestal configured to fix the worm wheel; and a case pivotably provided on the pedestal, wherein the second holding member is provided on the case or used also as the case.

Further features of the present invention will become apparent from the following description of exemplary embodiments with reference to the attached drawings.

DESCRIPTION OF THE EMBODIMENTS

Hereinafter, preferred embodiments of the present invention will be described in detail with reference to the attached drawings.

First Embodiment

Universal Head Apparatus

Figure 2:
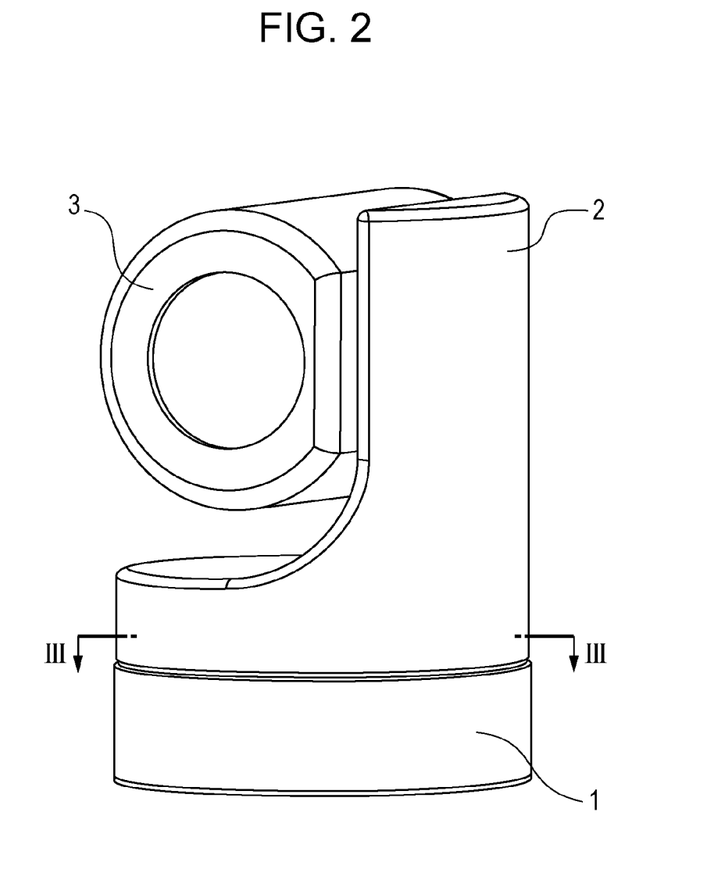
FIG. 2 is a perspective view of a universal head apparatus on which a worm mechanism according to an embodiment of the present invention is mounted.

FIG. 2 is a perspective view of a universal head apparatus on which a worm mechanism according to an embodiment of the present invention is mounted. A head 2 that is a case is attached to a pedestal 1 to be pivotable in the horizontal (i.e., pan) direction. The pedestal 1 is supported by a tripod or other mechanisms that are not illustrated. A housing 3 on which image pickup apparatus is mounted is attached to the head 2 in a manner that the housing 3 is pivotable in the vertical (i.e., tilt) direction.

Worm Mechanism

Figure 3:
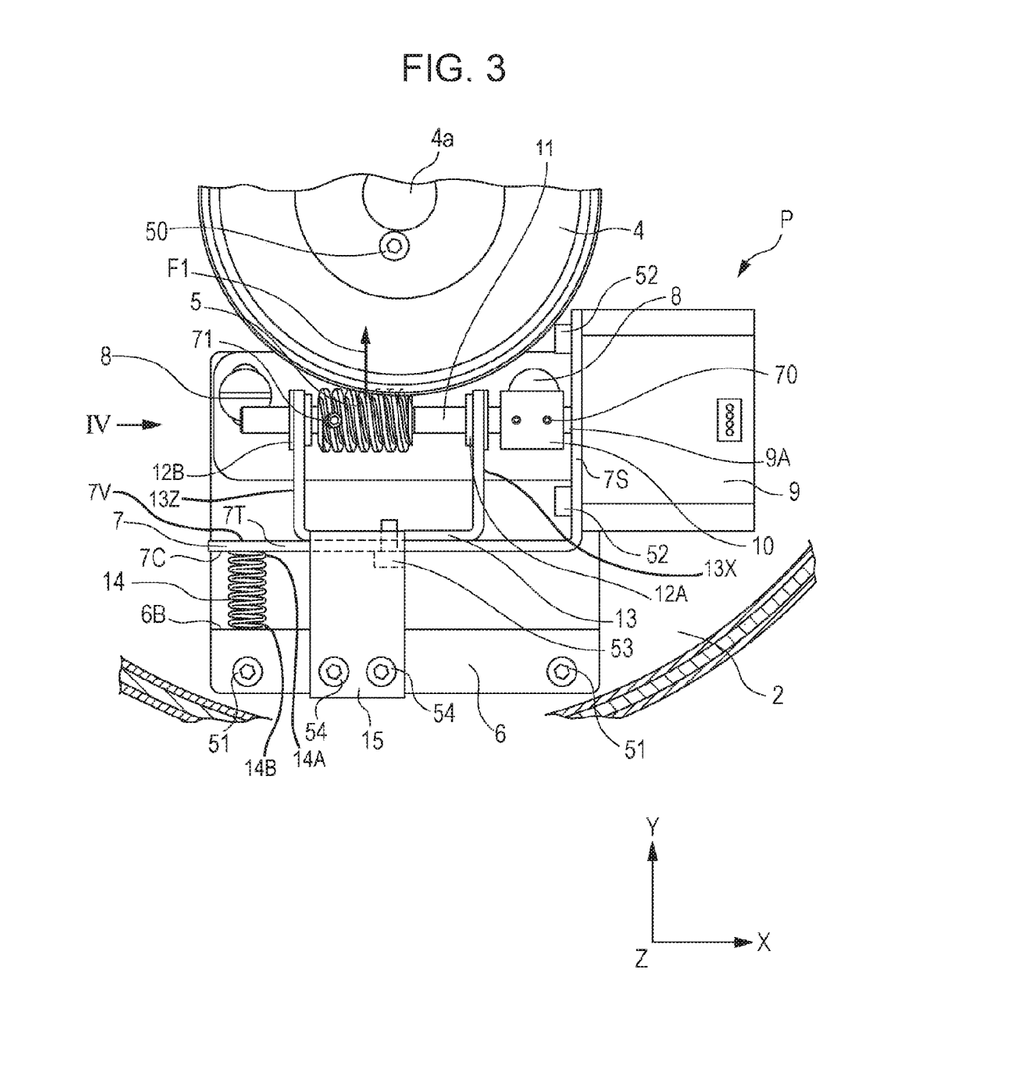
FIG. 3 is a cross-sectional view of the worm mechanism according to the embodiment of the present invention along an XY surface.

FIG. 3 is a cross-sectional view of the universal head apparatus illustrated in FIG. 2 along line III-III. Specifically, FIG. 3 is a cross-sectional view of the worm mechanism according to an embodiment of the present invention along an XY surface. FIG. 3 illustrates a horizontal (i.e., pan) drive portion in the head 2. The drive portion mainly includes a drive unit P provided with a worm (i.e., a screw gear) 5 and a worm wheel 4 which receives driving force transmitted from the drive unit P. The worm wheel 4 meshes with the worm 5. The worm wheel 4 is fixed to the pedestal 1 (see FIG. 2) with a screw 50, and the head 2 is supported by the pedestal 1 to be pivotable. The head 2 rotates about a shaft 4a of the worm wheel 4 when driving force is transmitted to the worm wheel 4 from the drive unit P.

Configuration of Drive Unit P

Figure 1A:
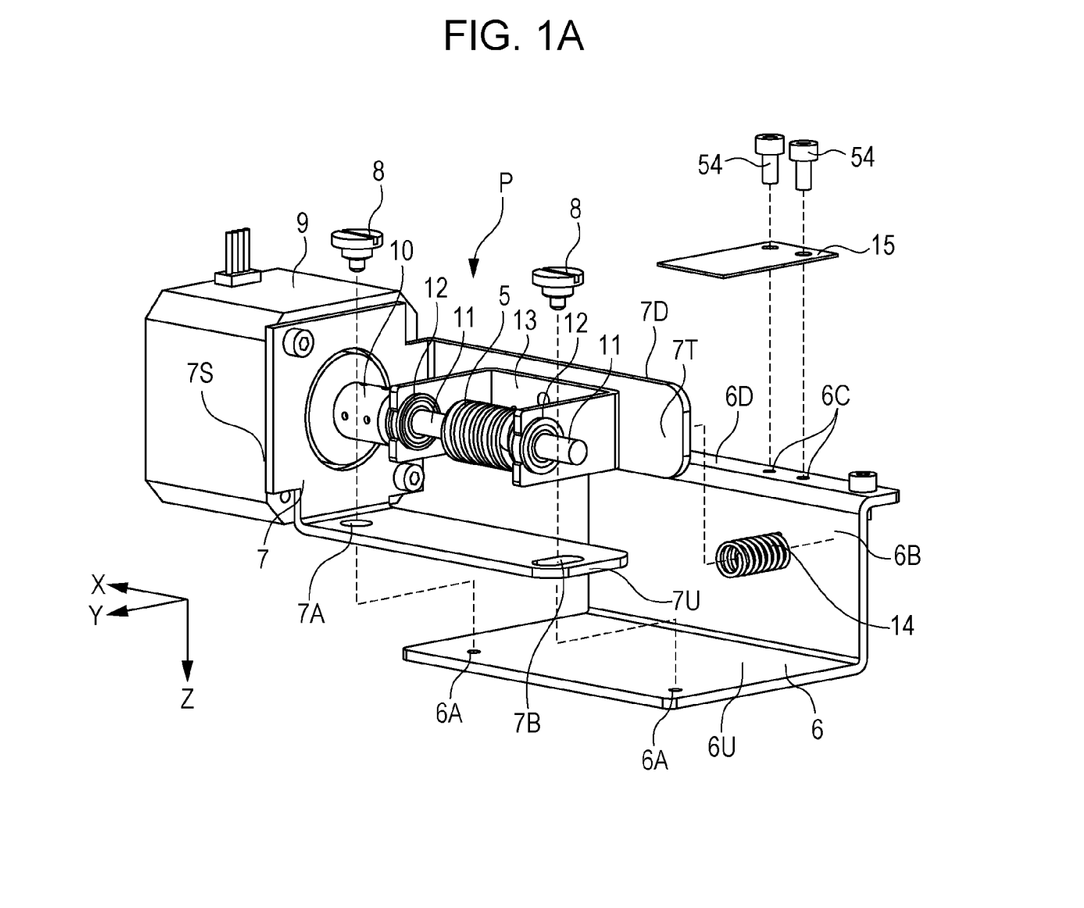
FIG. 1A is an exploded perspective view of a drive unit according to an embodiment of the present invention seen from one side.
Figure 1B:
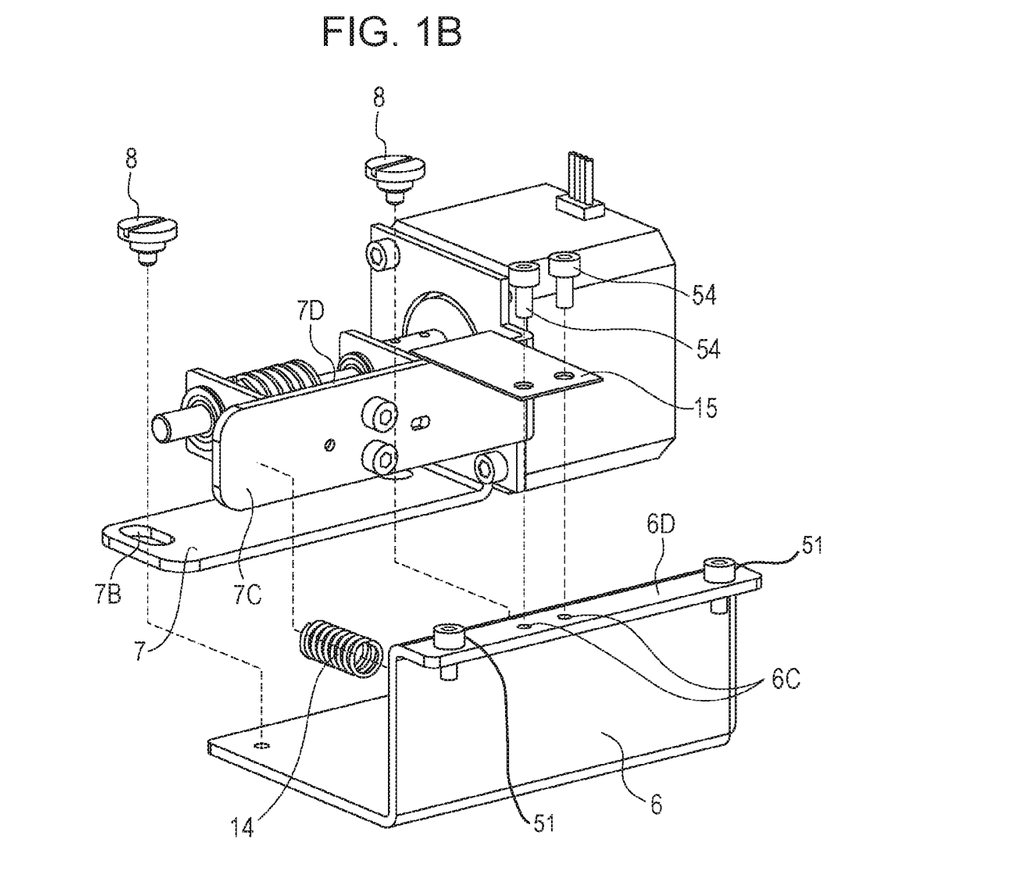
FIG. 1B is an exploded perspective view of the drive unit seen from another side.

The configuration of the drive unit P (see FIG. 3) will be described in detail. FIG. 1A is an exploded perspective view of the drive unit P according to an embodiment of the present invention seen from one side. FIG. 1B is an exploded perspective view of the drive unit P seen from another side.

Figure 4:
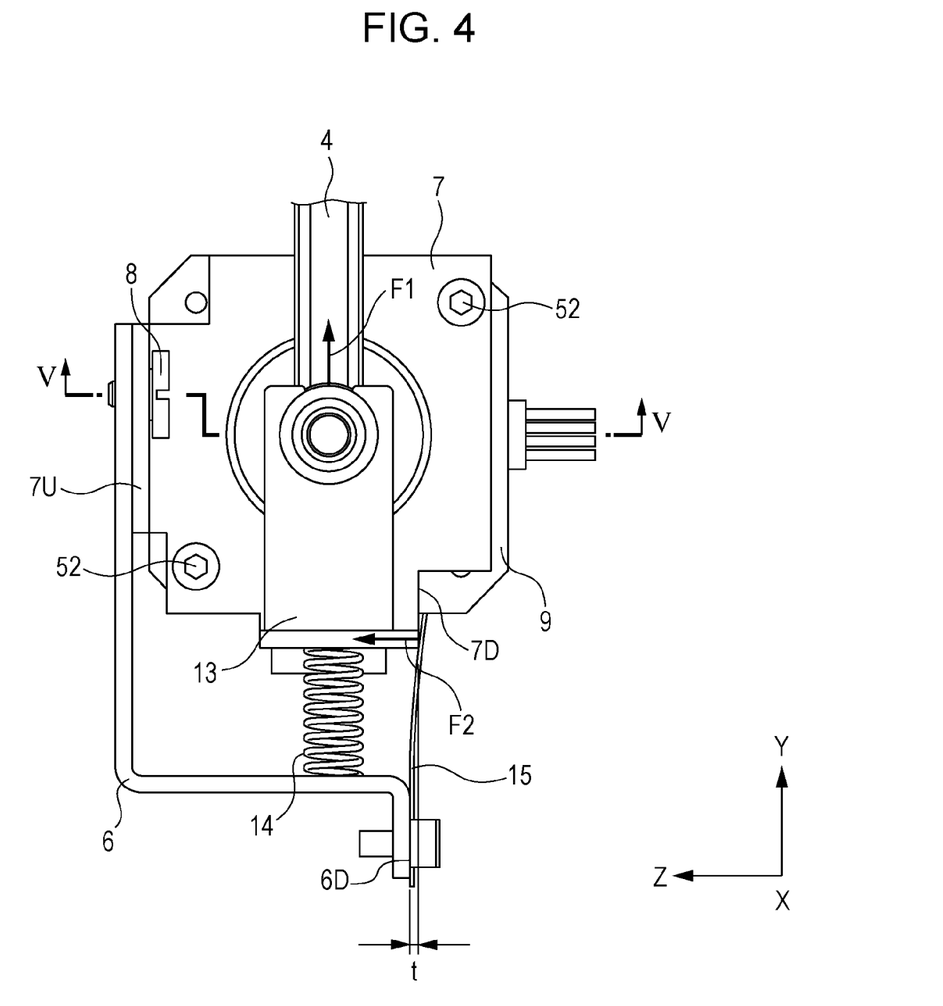
FIG. 4 is a cross-sectional view of the worm mechanism according to the embodiment of the present invention along a YZ surface.
Figure 5:
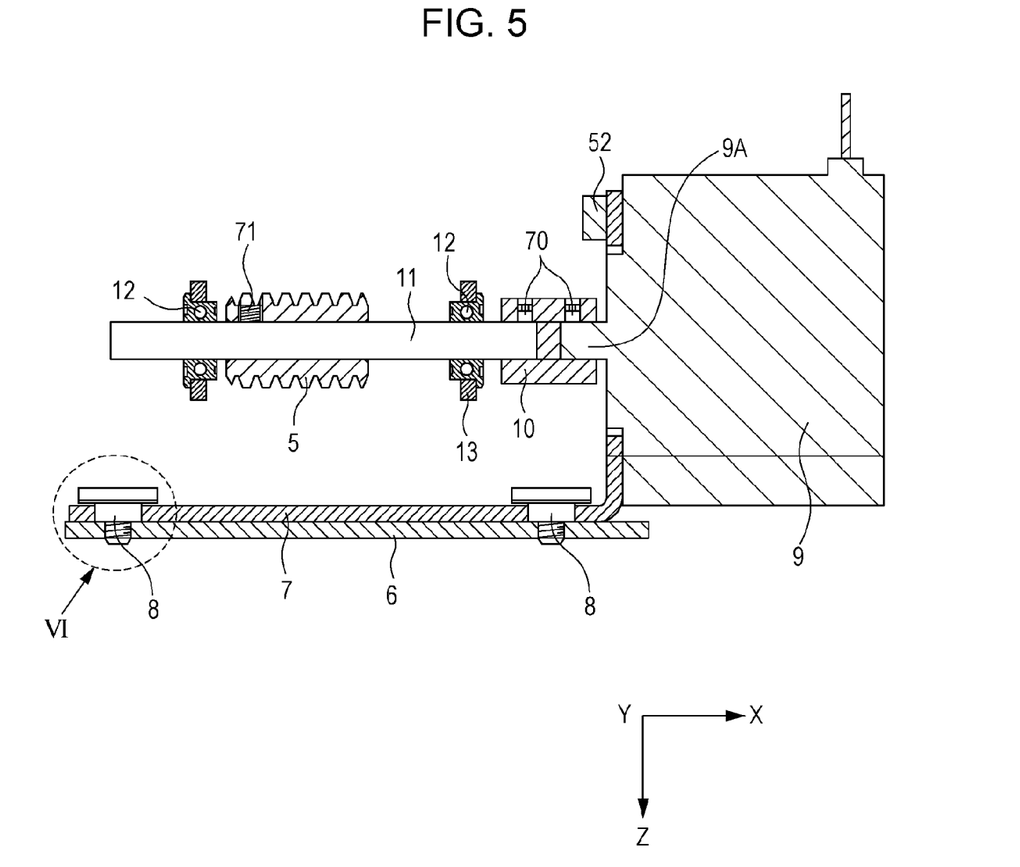
FIG. 5 is a cross-sectional view of the worm mechanism according to the embodiment of the present invention along an XZ surface.

FIGS. 3 to 5 are cross-sectional views of the worm mechanism according to the present embodiment along an XY surface, a YZ surface, and an XZ surface, respectively.

1) First Holding Member and Second Holding Member

A first holding member includes an L-shaped drive sheet metal 7 and a holding tool (i.e., a holding portion) 13. As illustrated in FIG. 3, a motor (i.e., a drive source) 9 is fixed, with a screw 52, to a first surface 7S (see FIG. 3) of the L-shaped drive sheet metal 7 that is a part of the first holding member. An output of the motor 9 is transmitted to a worm shaft 11 via a joint (i.e., a joining unit) 10. To transmit rotation of a motor shaft (i.e., a drive shaft) 9A to the worm shaft 11, the motor shaft 9A and the worm shaft 11 are each joined to the joint 10 with a setscrew 70 as illustrated in FIG. 5.

A holding tool 13 is fixed to a second surface 7T (see FIG. 1A) with a screw 53. The second surface 7T perpendicularly crosses the first surface 7S of the L-shaped drive sheet metal 7 that is a part of the first holding member. The holding tool 13 integrally holds two bearings 12 (i.e., a first bearing 12A that is proximate to the motor 9, and a second bearing 12B that is distal to the motor 9) that support the worm shaft 11 at both sides (of the worm 5) so that the worm shaft 11 is rotatable. The holding tool 13 includes a first support 13X for the first bearing 12A and a second support 13Z for the second bearing 12B. In this configuration, the worm 5 is rotatable. This means that the first holding member joins (i.e., integrally holds) the motor to the bearings. A setscrew 71 is attached to the worm shaft 11 and, therefore, the worm 5 is rotated integrally with the worm shaft 11.

The first surface 7S of the L-shaped drive sheet metal 7 that is a part of the first holding member and a third surface 7U perpendicularly crossing the second surface 7T are joined, with a shaft screw (i.e., a fixing portion) 8, to a surface 6U of an L-shaped base sheet metal 6 that is a second holding member. The L-shaped drive sheet metal 7 that is a part of the first holding member has two openings in an axial direction (i.e., an X direction) of the worm. At the openings, the drive sheet metal 7 is joined to the base sheet metal 6 with screws. One of the two openings located near the motor (i.e., on a drive source side) is a round hole 7A whereas the other located far from the motor (i.e., on the worm side) is an elongated hole 7B.

In this configuration, in a plane parallel to a plane in which the worm wheel 4 is disposed (i.e., the XY surface), adjustment of rotation of the drive sheet metal 7 about the round hole 7A with respect to the base sheet metal 6 may be performed with the drive sheet metal 7 holding the motor 9 and the worm shaft 11. That is, the base sheet metal 6 holds the drive sheet metal 7 to be movable in the direction in which the worm 5 meshes with the worm wheel 4 (i.e., a first direction). With this configuration, coaxiality between the motor shaft 9A and the worm shaft 11 is kept constant in the present embodiment. Operations become unstable in the drive side when coaxiality between the motor shaft and the worm shaft joined to the motor shaft decreases. However, such unstable operations are not caused in the present embodiment.

In the present embodiment, the base sheet metal 6 (i.e., a fixing member) that is the second holding member is separately fixed with a screw 51 (see FIG. 3) to the head 2 that is a case.

2) Joint of First Holding Member and Second Holding Member

In the present embodiment, the drive sheet metal 7 that is a part of the first holding member and the base sheet metal 6 that is the second holding member are joined to the shaft screw 8. Details of the shaft screw 8 is described with reference to FIG. 6, which is an enlarged view of a VI portion of FIG. 5. A screw 8A is formed at an end of the shaft screw 8. The screw 8A is fastened to a female screw (i.e., a receiving portion) 6A provided in the base sheet metal 6. As is described above with reference to FIG. 1A, the round hole 7A and the elongated hole 7B are provided in the drive sheet metal 7, in each of which a shaft 8B of the shaft screw 8 is insertable.

A clearance a is provided between a surface 8C of the shaft screw 8 and the drive sheet metal 7 to enable a slide movement of the drive sheet metal 7. After being attached to the base sheet metal 6 with the shaft screw 8, the drive sheet metal 7 is rotatable about the round hole 7A regulating a rotation angle of the drive sheet metal 7 by only in the range of the elongated hole 7B. By thus the elongated hole 7B, tooth skip caused between the worm 5 and the worm wheel 4 may be prevented and damage to the teeth may be prevented in a case in which, for example, the head 2 is rotated by external force.

3) Urging Member

An urging member of the drive unit P is described with reference to FIGS. 1A, 1B, and 3. A spring 14 (i.e., a first urging member) is disposed between a surface 6B of the base sheet metal 6 that is the second holding member (see FIG. 1A) and a surface 7C of the drive sheet metal 7 that is a part of the first holding member (see FIG. 1 B). Elastic force of the spring 14 urges the drive sheet metal 7 toward the worm wheel 4 (i.e., a direction F1 illustrated in FIG. 4). The spring 14 includes a first end 14A that urges the drive sheet metal 7 in a first direction (direction F1) and includes a second end 14B that urges the base sheet metal 6 in an opposite direction to the first direction. The spring 14 contacts an urged portion 7V of the drive sheet metal 7, and the urged portion 7V extends from the second support 13Z to an end of the drive sheet metal 7 that is distal to the motor 9. The direction F1 corresponds to a direction in which the worm 5 meshes with the worm wheel 4 (i.e., a first direction). The backlash is thus removed. A coil spring is used as the spring 14.

In the present embodiment in which the worm and the worm wheel are used, the worm also receives, from the worm wheel, reaction force in the axial direction of the worm wheel in addition to reaction force in the radial direction of the worm wheel when the worm is moving. That is, if the worm is simply urged in the direction of the worm wheel, the reaction force in the axial direction of the worm wheel moves the worm shaft in the axial direction and the pan and tilt operations become unstable.

In the present embodiment, to avoid such unstable operations, the female screw 6C for mounting a plate spring 15 (i.e., a second urging member) is provided in the base sheet metal 6 and the plate spring 15 may be fixed to the base sheet metal 6 with a screw 54.

Specifically, a step t (see FIG. 4) is produced between a surface 6D of the base sheet metal 6 and a surface 7D of the drive sheet metal 7 in a state in which the drive sheet metal 7 is assembled to the base sheet metal 6. When the plate spring 15 is fixed to the base sheet metal 6, the plate spring 15 is elastically deformed by the existence of the surface 7D and produces elastic force toward the drive sheet metal 7. The elastic force urges the drive sheet metal 7 in a rotation shaft direction (i.e., an F2 direction in FIG. 4) of the worm wheel 4. This removes a backlash between the drive sheet metal 7 that is a part of the first holding member and the base sheet metal 6 that is the second holding member.

The above configuration urges the worm 5 in the direction F1 of the worm wheel 4 and in the rotation shaft direction F2 of the worm wheel 4. Consequently, the reaction force from the worm wheel 4 is canceled and a backlash between the worm 5 and the worm wheel 4 is automatically removed.
Effects of the Present Embodiment In the present embodiment, the motor 9 and the worm shaft 11 are fixed to the drive sheet metal 7. In this configuration, the motor shaft 9A and the worm shaft 11 are swung integrally with each other when the worm shaft 11 is swung due to eccentricity of the worm wheel 4 and eccentricity of the worm 5 at the time of driving of the universal head apparatus. Consequently, coaxiality between the motor shaft 9A and the worm shaft 11 may be kept constant. Since the spring 14 and the plate spring 15 that are the urging units urge the drive sheet metal 7, load on the bearings 12 that support the worm shaft 11 may be reduced. The above configuration provides a worm mechanism with reduced load on bearings and improved durability while reducing a backlash between gears, and also provides a universal head apparatus using the worm mechanism.

Second Embodiment

Figure 6:
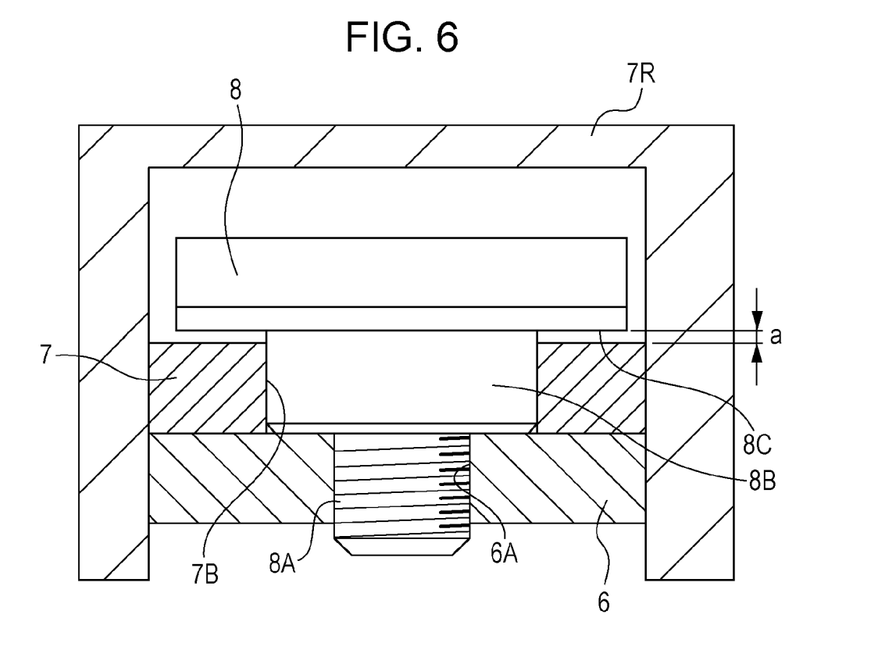
FIG. 6 is a partially enlarged view of a shaft screw portion according to an embodiment of the present invention.
Figure 7:
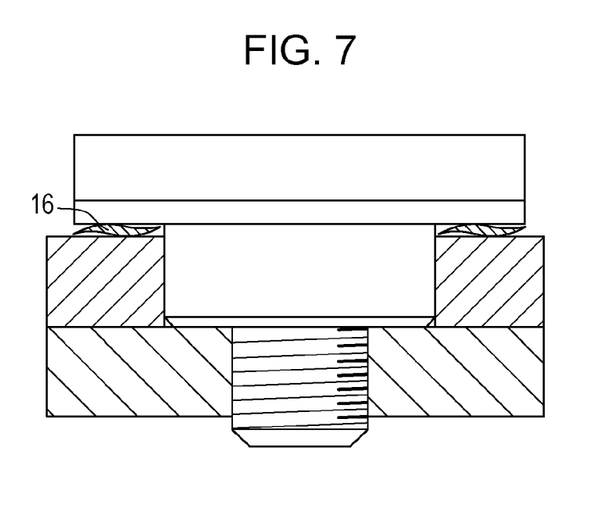
FIG. 7 is a partially enlarged view of a shaft screw portion according to another embodiment of the present invention in which a waved washer is used.

The drive sheet metal 7 is urged in the F2 direction by the plate spring 15 in the first embodiment. In the present embodiment, instead of using the plate spring 15, a waved washer 16 is disposed in the clearance a as illustrated by FIG. 6. The waved washer 16 disposed between the shaft screw 8 and the drive sheet metal 7 urges a location of a surface 7R of FIG. 6. Since other configurations of the present embodiment are the same as those of the first embodiment, further description is omitted.
Modifications Preferred embodiments of the present invention have been described above, but the present invention is not limited to the same. Various modifications and changes may be made without departing from the scope of the present invention.
Modification 1

In the above embodiment, the base sheet metal 6 that is the second holding member is provided separately from the head 2 that is the case. However, the base sheet metal 6 may be used also as the head 2 that is the case (i.e., the structure of the base sheet metal 6 is used in the head 2). In this case, the drive sheet metal 7 is directly attached to the head 2. That is, the base sheet metal 6 and the head 2 may be integrated.

If the base sheet metal 6 and the head 2 are provided separately, since the drive portion is formed as a unit, the universal head apparatus may be assembled more easily. If, on the other hand, the base sheet metal 6 and the head 2 are integrated, the number of parts may be reduced and, as a result, the cost may be reduced.
Modification 2

In the above embodiment, rotation of the motor shaft (i.e., the drive shaft) 9A is transmitted to the worm shaft 11 and to the worm 5 via the joint (i.e., the joining unit) 10. However, the motor shaft 9A and the worm 5 may be provided integrally. In that case, the worm shaft 11 and the joint (i.e., the joining unit) 10 may be omitted. Alternatively, the motor shaft 9A and the worm shaft 11 may be provided integrally and only the joint (i.e., the joining unit) 10 may be omitted.
Modification 3

In the above embodiment, the rotation of the motor shaft 9A is transmitted to the worm shaft 11 via the joint (i.e., the joining unit) 10 and the bearings 12 of the worm shaft 11 are provided at both sides of the worm 5. However, the bearings 12 may be provided with the worm 5 and the joint (i.e., the joining unit) 10 being disposed therebetween.

Modification 4

In the above embodiment, the first holding member has a structure in which the holding tool 13 is joined to the drive sheet metal 7 (i.e., a two-member structure). Alternatively, the drive sheet metal 7 may include the structure (i.e., a holding portion) of the holding tool 13 (i.e., an integral structure). The integral structure may reduce the number of parts and, as a result, may reduce the cost.
Modification 5

In the above embodiment, the motor is used as the drive source. However, the drive source is not limited to the motor. Other drive sources may also be used.
Modification 6

In the above embodiment, the first urging member is provided between the first holding member and the second holding member. However, the position of the first urging member is not limited to the same. The first urging member may be provided any other positions where the first holding member is urged in the direction in which the worm meshes with the worm wheel (i.e., the first direction).
Advantageous Effects of Invention According to the present invention, a worm mechanism with reduced load on bearings and improved durability while reducing a backlash between gears, and a universal head apparatus using the worm mechanism can be produced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-016780, filed Jan. 31, 2014 which is hereby incorporated by reference herein in its entirety.

What is claimed is:

1. A worm mechanism provided with a worm shaft including a worm, bearings supporting the worm shaft at both sides so that the worm shaft is rotatable, and a worm wheel that meshes with the worm, the worm mechanism comprising:
    a first holding member that holds a drive source that drives the worm shaft and that holds the bearings; and
    a first urging member configured to urge the first holding member in a first direction in which the worm meshes with the worm wheel,
    wherein the first holding member includes a holding portion configured to hold bearings that support the worm shaft at both sides so that the worm shaft is rotatable, and
    wherein the first holding member includes: a first surface holding the drive source; a second surface crossing perpendicularly the first surface and holding the holding portion; and a third surface crossing perpendicularly the first surface and the second surface, and being held by a second holding member.

2. The worm mechanism according to claim 1, further comprising a second holding member configured to hold the first holding member to be movable in the first direction.

3. The worm mechanism according to claim 2, wherein the first holding member is joined to the second holding member with a screw.

4. The worm mechanism according to claim 3, wherein the second urging member is a waved washer provided between a screw used for a joint with the screw and the first holding member.

5. The worm mechanism according to claim 2, wherein, in a plane parallel to a plane in which the worm wheel is disposed, the first holding member is provided so that adjustment of rotation with respect to the second holding member is possible.

6. The worm mechanism according to claim 1, further comprising a joining unit configured to join a drive shaft of the drive source to the worm shaft.

7. The worm mechanism according to claim 1, further comprising a second urging member configured to urge the first holding member in a rotation shaft direction of the worm wheel.

8. The worm mechanism according to claim 7, wherein the second urging member is a plate spring.

9. The worm mechanism according to claim 1, wherein the first urging member is provided between the first holding member and the second holding member.

10. The worm mechanism according to claim 1, wherein the first urging member is a coil spring.

11. The worm mechanism according to claim 1,
wherein the first urging member is configured to urge a first position of the first holding member in the first direction, and
wherein the first position is on an opposite side of the drive source in between a position where the worm meshes with the worm wheel.

12. The worm mechanism according to claim 1,
wherein the first urging member exerts a force on the first holding member in the first direction, and
wherein the first direction is substantially perpendicular to the worm shaft.

13. The worm mechanism according to claim 1, wherein a longitudinal axis of the first urging member is substantially perpendicular to a longitudinal axis of the worm shaft.

14. The worm mechanism according to claim 1, wherein the first holding member rigidly holds the drive source and the bearings.

15. The worm mechanism according to claim 1,
wherein the bearings include
a first bearing that is proximate to the drive source and
a second bearing that is distal to the drive source,
wherein the first holding member includes
a first end that is proximate to the drive source,
a second end that is distal to the drive source,
a first support for the first bearing,
a second support for the second bearing, and
an urged portion that extends from the second support for the second bearing to the second end that is distal to the drive source, and
wherein the first urging member contacts the urged portion of the first holding member.

16. A worm mechanism provided with a worm shaft including a worm, bearings supporting the worm shaft at both sides so that the worm shaft is rotatable, and a worm wheel that meshes with the worm, the worm mechanism comprising:
a first holding member that holds a drive source that drives the worm shaft and that holds the bearings; and
a first urging member configured to urge the first holding member in a first direction in which the worm meshes with the worm wheel,
a second holding member configured to hold the first holding member to be movable in the first direction,
wherein, in a plane parallel to a plane in which the worm wheel is disposed, the first holding member is provided so that adjustment of rotation with respect to the second holding member is possible, and
wherein the first holding member includes two openings in an axial direction of the worm through which the first holding member is joined to the second holding member with screws, one of the openings on a drive source side being a round hole whereas the other of the openings on a worm side being an elongated hole extending in the first direction.

17. A universal head apparatus, comprising:
a worm mechanism which includes:
a worm shaft including a worm,
bearings supporting the worm shaft at both sides so that the worm shaft is rotatable,
a worm wheel configured to mesh with the worm,
a first holding member that holds a drive source that drives the worm shaft and that holds the bearings, and
a first urging member configured to urge the first holding member in a first direction in which the worm meshes with the worm wheel;
a second holding member that contacts the first urging member,
a pedestal configured to fix the worm wheel; and
a case pivotably provided on the pedestal,
wherein a first end of the first urging member urges the first holding member in the first direction, and
wherein a second end of the first urging member urges the second holding member in an opposite direction to the first direction.

18. The universal head apparatus according to claim 17,
wherein the second holding member is configured to hold the first holding member to be movable in the first direction, and
wherein the second holding member is provided on the case or used also as the case.

19. The universal head apparatus according to claim 17, wherein the first holding member is positioned between the worm shaft and the second holding member.

20. A worm mechanism provided with a worm shaft including a worm, bearings supporting the worm shaft at both sides so that the worm shaft is rotatable, and a worm wheel that meshes with the worm, the worm mechanism comprising:
a first holding member that holds a drive source that drives the worm shaft and that holds the bearings;
a first urging member configured to urge the first holding member in a first direction in which the worm meshes with the worm wheel,
wherein the bearings include
a first bearing that is proximate to the drive source and
a second bearing that is distal to the drive source,
wherein the first holding member includes
a first end that is proximate to the drive source,
a second end that is distal to the drive source,
a first support for the first bearing,
a second support for the second bearing, and
an urged portion that extends from the second support for the second bearing to the second end that is distal to the drive source, and
wherein the first urging member contacts the urged portion of the first holding member.

* * * * *